United States Patent
Lie et al.

(10) Patent No.: US 9,167,232 B2
(45) Date of Patent: Oct. 20, 2015

(54) SYSTEM FOR CONVERTING 2D VIDEO INTO 3D VIDEO

(75) Inventors: Wen-Nung Lie, Chia-Yi County (TW); Hsiang-Yun Huang, Pingtung County (TW); Wei-Chih Chen, Chia-Yi County (TW)

(73) Assignee: NATIONAL CHUNG CHENG UNIVERSITY, Chia-Yi County (TW)

(*) Notice: Subject to any disclaimer, the term of this patent is extended or adjusted under 35 U.S.C. 154(b) by 687 days.

(21) Appl. No.: 13/543,179

(22) Filed: Jul. 6, 2012

(65) Prior Publication Data
US 2013/0162768 A1    Jun. 27, 2013

(30) Foreign Application Priority Data
Dec. 22, 2011    (TW) .............................. 100148008 A

(51) Int. Cl.
*H04N 13/02*    (2006.01)
*G06K 9/00*    (2006.01)
*G06T 7/00*    (2006.01)

(52) U.S. Cl.
CPC ........ *H04N 13/0264* (2013.01); *G06K 9/00765* (2013.01); *G06T 7/0071* (2013.01); *G06T 2207/10016* (2013.01); *G06T 2207/10024* (2013.01); *G06T 2207/20021* (2013.01)

(58) Field of Classification Search
CPC ................. G06K 9/00765; G06T 2207/10016; G06T 2207/10024; G06T 2207/20021; G06T 7/0071; H04N 13/0264
See application file for complete search history.

(56) References Cited

U.S. PATENT DOCUMENTS

| | | | |
|---|---|---|---|
| 6,625,333 B1 * | 9/2003 | Wang et al. ................... | 382/300 |
| 6,664,958 B1 * | 12/2003 | Leather et al. ................ | 345/422 |
| 7,161,614 B1 * | 1/2007 | Yamashita et al. ............. | 348/42 |
| 2004/0189796 A1 * | 9/2004 | Ho et al. ......................... | 348/51 |
| 2006/0083440 A1 * | 4/2006 | Chen ............................ | 382/284 |

(Continued)

FOREIGN PATENT DOCUMENTS

WO    WO 2008/080156    7/2008

OTHER PUBLICATIONS

Cheng C.-.C., Li C.-T., Huang P.-S., Lin T.-K., Tsai Y.-M., and Chen L.-G., "A Block-based 2D-to-3D Conversion System with Bilateral Filter", in International Conference on Consumer Electronics (ICCE),2009, Las Vegas, NV, USA, published by IEEE.;2 pages.

*Primary Examiner* — Sath V Perungavoor
*Assistant Examiner* — Peter D Le
(74) *Attorney, Agent, or Firm* — Muncy, Geissler, Olds & Lowe, P.C.

(57) ABSTRACT

A 2D video to 3D video conversion system includes a video content analysis unit, a depth estimation unit, a post-processing unit, and a stereoscopic video generation unit. The video content analysis unit can analyze a 2D video datum and extract useful information including motion and color from the 2D video datum for depth estimation. The depth estimation unit is adapted for receiving the useful information, calculating motion cue and contrast cue for initial depth estimation, and generating an initial depth map. The post-processing unit is adapted for correcting the initial depth map in spatial domain and temporal domain to increase accuracy in spatial domain and depth continuity between adjacent time instances and for processing the caption in the video to generate a final depth map. The stereoscopic video generation unit is adapted for synthesizing 3D video datum from the final depth map and 2D video datum.

8 Claims, 4 Drawing Sheets

(56) References Cited

U.S. PATENT DOCUMENTS

| | | | |
|---|---|---|---|
| 2008/0150945 A1* | 6/2008 | Wang et al. | 345/427 |
| 2008/0247670 A1* | 10/2008 | Tam et al. | 382/298 |
| 2010/0111444 A1* | 5/2010 | Coffman | 382/285 |
| 2010/0135581 A1* | 6/2010 | Baik et al. | 382/195 |
| 2010/0188584 A1* | 7/2010 | Liu et al. | 348/699 |
| 2010/0315488 A1* | 12/2010 | Kim et al. | 348/46 |
| 2011/0096832 A1* | 4/2011 | Zhang et al. | 375/240.08 |
| 2012/0075535 A1* | 3/2012 | Van Beek | 348/699 |
| 2012/0127267 A1* | 5/2012 | Zhang et al. | 348/43 |
| 2012/0134574 A1* | 5/2012 | Takahashi et al. | 382/154 |
| 2012/0293627 A1* | 11/2012 | Ishii | 348/46 |

* cited by examiner

SYSTEM FOR CONVERTING 2D VIDEO INTO 3D VIDEO

BACKGROUND OF THE INVENTION

1. Field of the Invention

The present invention relates generally to the image processing technology, and more particularly, to a system for converting the 2D video photographed by the conventional single-lens reflex (SLR) camera into the 3D video, which can be played by the 3D display device.

2. Description of the Related Art

One of the primary core technologies for converting the 2D video into the 3D video is depth estimation. In the Int'l Pub. No. WO 2008/080156, techniques for complexity-adaptive and automatic 2D to 3D image and video conversion were proposed. In the techniques, each frame of a 2D video is classified and partitioned into flat and non-flat regions. The flat regions (e.g., the background regions) are directly converted by simple depth estimation methods, while the non-flat regions (e.g., the foreground regions) are processed by complex methods. Thereafter, each frame is converted based on methods of adaptive complexity.

In a paper entitled "A block-based 2D-to-3D conversion System with bilateral filter" (published at pp. 1-2 of Int'l. Conf. on Consumer Electronics 2009 (ICCE '09) and co-authored by Chao-Chung Cheng, Chung-Te Li, Po-Sen Huang, Tsung-Kai Lin, Yi-Min Tsai, Liang-Gee Chen), it proposed two depth estimate modules—depth from motion (DOF) and depth from geometrical perspective (DOGP). The DOF module employs motion vector estimate for figuring out the motion of each block which can function as the depth estimation of the block. The DOGP module employs several kinds of user-defined background depth models and selects one proper background model by classification.

As indicated above, each of the aforesaid technologies of converting 2D into 3D is to carry out individual depth estimate based on the image information at one single time point, so the depths between adjacent time instances might be discontinuous to result in wrong perception of depth in the playback process of the 3D video. The above effect may be harmful to viewer's eyes after a long time. Besides, the aforesaid prior art did not apply any analysis to the video-capturing styles (e.g., static or moving camera) of the video content in need of conversion, so it is not applicable to pluralistic household or commercial video. The general commercial film may contain caption and the existing 3D video conversion technology does not process the caption, so it is subject to difficulty or uncomfortableness when the viewer reads the caption in a 3D stereo manner.

SUMMARY OF THE INVENTION

The primary objective of the present invention is to provide a system for converting the 2D video into the 3D video, wherein the system can heighten the quality of depth of video after conversion, enhance the depth continuity between adjacent time instances, and further bring more comfort for the viewer's eyes while watching the video.

The secondary objective of the present invention is to provide a system for converting the 2D video into the 3D video, which can process the caption to enhance the stereoscopic perception of the caption for more comfort while the viewer is watching the video.

The foregoing objectives of the present invention are attained by the system composed of a video content analysis unit, a depth estimation unit, a post-processing unit, and a stereoscopic video generation unit. The video content analysis unit can analyze 2D video and extract useful information including motion and color for depth estimation. The depth estimation unit is adapted for receiving the aforesaid useful information to calculate motion cue and contrast cue for initial depth estimation and for generating an initial depth map. The post-processing unit is adapted for correcting the initial depth map in spatial and time domains to increase the accuracy and temporal continuity of depths and for processing the caption in the video to generate a final depth map. The stereoscopic video generation unit is adapted for synthesizing 3D stereo video based on the original 2D video and the final depth maps.

DETAILED DESCRIPTION OF PREFERRED EMBODIMENTS

Figure 1:
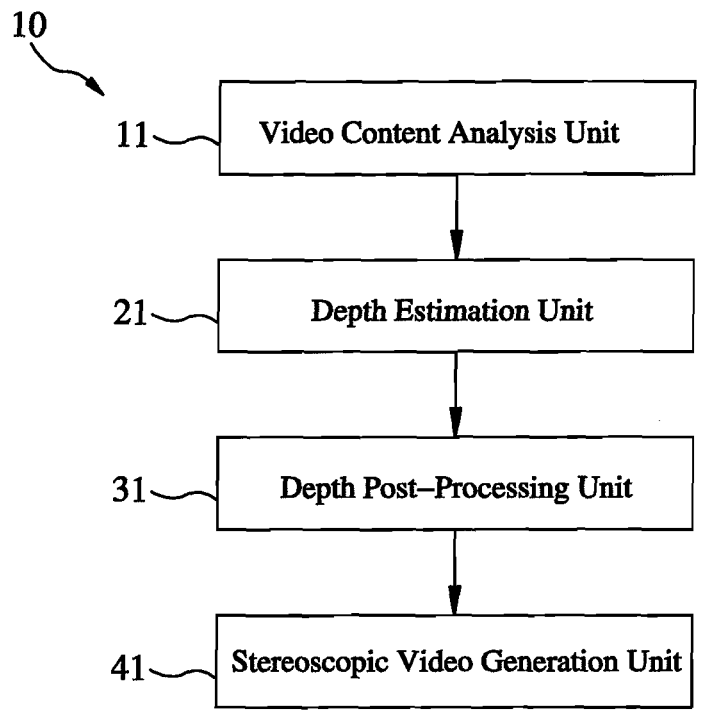
FIG. 1 is a block diagram of a preferred embodiment of the present invention, illustrating the framework of the present invention.

Referring to FIG. 1, a system 10 for converting 2D video into 3D video in accordance with a preferred embodiment of the present invention is composed of a video content analysis unit 11, a depth estimation unit 21, a depth post-processing unit 31, and a stereoscopic video generation unit 41. The detailed descriptions and operations of these elements as well as their interrelations are recited in the respective paragraphs as follows.

Figure 2:
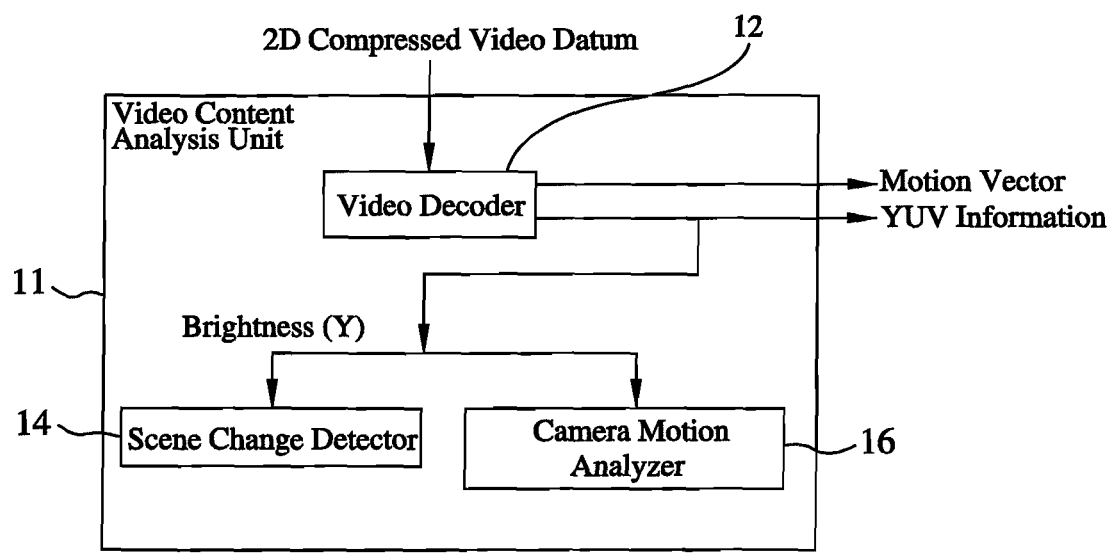
FIG. 2 is a block diagram of a part of the preferred embodiment of the present invention, illustrating the framework of the video content analysis unit.

The video content analysis unit 11 can analyze 2D video datum and extract useful information including motion and color from the 2D video datum for depth estimation. In this embodiment, as shown in FIG. 2, the video content analysis unit 11 includes a video decoder 12, a scene change detector 14, and a camera motion analyzer 16. Because MPEG-2 is a currently very common compression standard, it is adopted as an example for video compression in this embodiment and the video decoder 12 is also based on MPEG-2 as an example. The other compression standards, such as H.263/H.264/H.26X and MPEG-4, are also applicable to the present invention.

The video decoder 12 is adapted for decoding the compressed 2D video datum to acquire luminance-chrominance (YUV) information for depth estimation and to acquire motion vectors as object motion information for depth estimation. The YUV information and the motion vectors are the aforesaid useful information. In the YUV information, it is sufficient to use only the Y (brightness) component for representing the frame texture information of a frame in depth estimation, so the YUV information is hereinafter referred to as "Y". Because the scene may be changed subject to camera motion, it is necessary to consider the scene change and thus the scene change detector 14 is adopted in the present invention.

Based on an improved histogram comparison method, the scene change detector 14 can compare the difference of luminance distribution between adjacent frames in the 2D video datum to further identify whether there is any scene change. The improved histogram comparison method divides the current frame into a plurality of image blocks and compares the histograms of the blocks at the same positions between adjacent frames. A histogram difference threshold is set for each of the blocks, which are different from each other or one another. Because the primary video content is mostly located close to the frame center, the difference thresholds of the blocks near the center are bigger and others for boundary blocks are smaller. In this way, the difference tolerances for boundary blocks will be smaller than those for central blocks. If the number of blocks whose differences exceed the thresholds is larger than a pre-determined value, it will be identified that a scene change happens. The following equations can demonstrate the above description.

$$DH_{i,u,v} = \frac{1}{L}\sum_{n=0}^{L-1} histogram_{i,u,v}(n) - histogram_{i-1,u,v}(n) \quad (1)$$

$$DBH_{i,u,v} = \begin{cases} 1 & \text{if } DH_{i,u,v} > t_{u,v} \text{ or } DH_{i,u,v} > \alpha \times AVG\ DH_{i,u,v} \\ 0 & \text{otherwise} \end{cases}$$

$$\sum_{u=0,v=0}^{3,3} DBH_{i,u,v} > T_3$$

where $histogram_{i,u,v}(n)$ denotes the intensity value of the histogram of the (u,v)-th block, i denotes the index of the current frame, $t_{u,v}$ denotes the difference threshold for the (u,v)-th block, and $T_3$ is the preset threshold for the number of blocks that exceed the histogram differences. To adapt to various circumstances of scene change, the above equation (1) can further have one more condition, i.e. $DH_{i,u,v} > \alpha \times AVGDH_{i,u,v}$, where the threshold is set to be the mean histogram difference of previous K frames and $\alpha$ is a predetermined value ranging between 0.0 and 1.0, as shown in the following equation (2), $$AVGDH_{i,u,v} = \frac{1}{K}\sum_{k=i-1}^{i-K} DH_{k,u,v} \quad (2)$$

Figure 3:
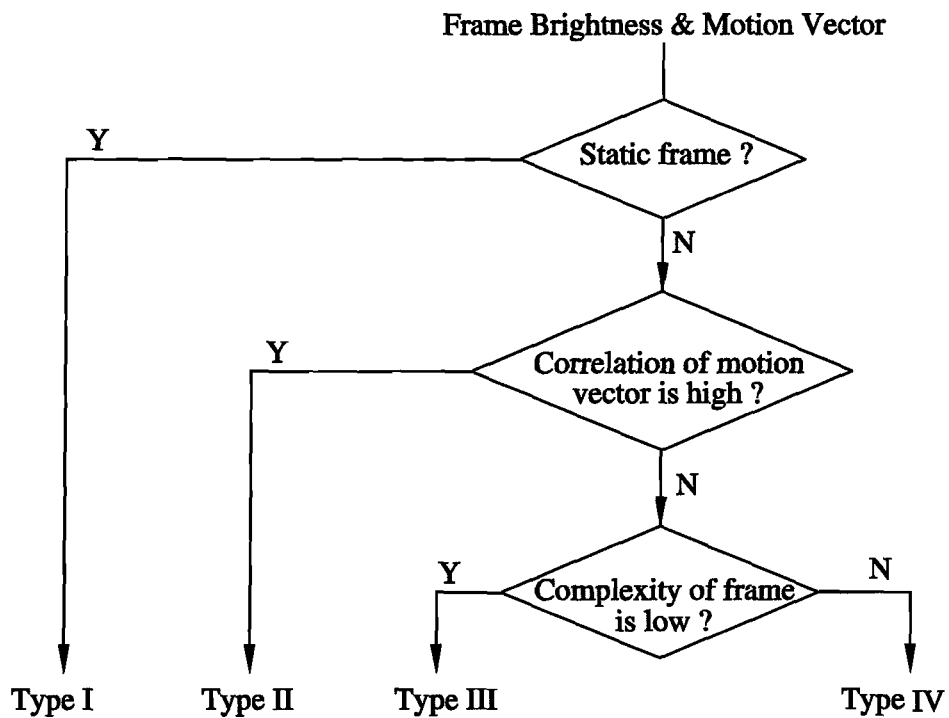
FIG. 3 is a flow chart of the preferred embodiment of the present invention, illustrating the identification of the type of camera motion for the 2D video clip.

The camera motion analyzer 16 is adapted for analyzing and classifying the style of camera motion, amount of movement of an object in the frame, and complexity of frame in the 2D video datum. FIG. 3 shows the process of the classification, which has four types: (1) both of the object and the camera are static, i.e. the frame content is almost static; (2) the object is static and the camera is moving; (3) the object is moving and the camera is moving or not moving, with a frame content of low complexity; and (4) the object is moving and the camera is moving or not moving, with a frame content of high complexity. Whether the frame content is of low or high complexity is determined based on the graylevel variance of the frame pixels. If the graylevel variance of the frame pixels is larger than a threshold, it will be classified as high complexity. On the contrary, it will be classified as low complexity. The graylevel variance is calculated as per the following equation (3).

$$var_i = \frac{1}{M \times N}\sum_{x=0,y=0}^{M-1,N-1}(f_i(x,y) - \overline{f_i})^2 \quad (3)$$

where $f_i(x,y)$ denotes the image pixel graylevel value, i denotes the current frame index, $\overline{f}$ denotes the mean pixel value inside the image, M denotes the length of the image, and N denotes the width of the image.

Figure 4:
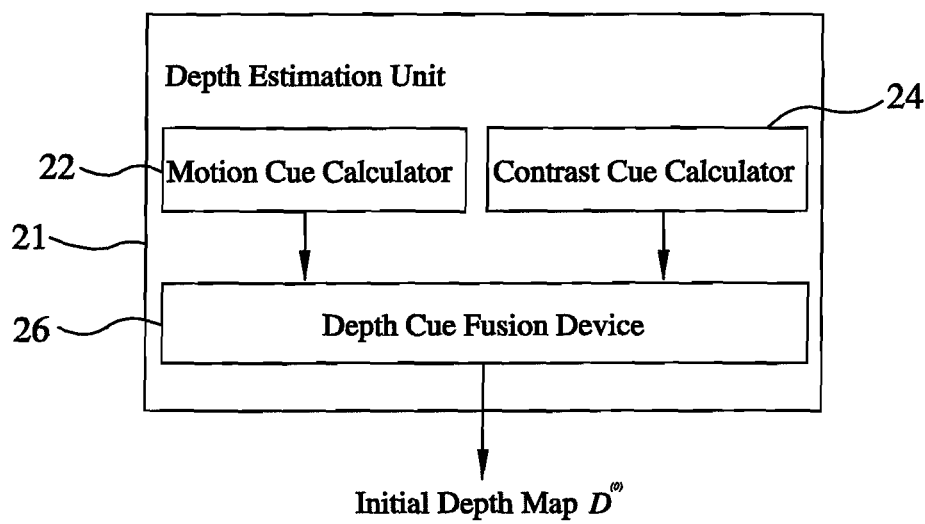
FIG. 4 is a block diagram of the preferred embodiment of the present invention, illustrating the framework of the depth estimation unit.

The depth estimation unit 21 is adapted for receiving the useful information, calculating motion cue and contrast cue for initial depth estimation, and generating an initial depth map $D^{(0)}$. In this embodiment, as shown in FIG. 4, the depth estimation unit 21 includes a motion cue calculator 22, a contrast cue calculator 24, and a depth cue fusion device 26.

The motion cue calculator 22 is adapted for dividing the frame into a plurality of blocks for calculating the motion vector associated with each of the blocks or acquiring the motion vector decoded by the video decoder 12 to further figure out the motion cue $\hat{d}^M(m,n)$ for each block, wherein (m,n) denotes the block index. In this embodiment, the motion vectors decoded by the video decoder 12 are used as an example for calculating the motion cue. Because the motion vectors decoded from MPEG-2 bit stream are for the purpose of compression, what are acquired may not be the true motion vectors and need further correction. Whether they require correction or not is decided based on the distribution of the motion vectors, in all directions, of the current block and its 3×3 adjacent blocks. In this embodiment, the motion vectors are divided into five directions and the direction having the largest number of blocks is defined as the dominant direction. If the number of the blocks belonging to the dominant direction is smaller than four, it will be identified that motion vectors around the current block are somewhat random and they do not need any correction. If said number is larger than four, correct the motion vector of the current block to the mean vector of the motion vectors belonging to the dominant direction and recalculate the motion cue.

The contrast cue calculator 24 is based on a method of calculating the contrast value based on the luminance values of pixels within each block. Under the influence of particles or mist in the air, one distant object may look vague; namely, one closer object looks clearer and sharper and on the contrary, one farther object looks vaguer. Hence, the contrast value can be one of the depth cues and can function as the auxiliary information for depth estimation. The following equations can demonstrate the above description.

$$H(m,n) = \sum_{x=0,y=0}^{7,7} f_{m,n}(x,y), \text{ where } f_{m,n}(x,y) > \overline{f} \quad (4)$$

$$L(m,n) = \sum_{x=0,y=0}^{7,7} f_{m,n}(x,y), \text{ where } f_{m,n}(x,y) \leq \overline{f}$$

-continued $$d^C(m, n) = \frac{H(m, n) - L(m, n)}{H(m, n) + L(m, n)}$$

where (m, n) denotes the index of the current block including 8×8 pixels, $f_{m,n}(x,y)$ denotes the pixel within the block, $\bar{f}$ denotes the mean luminance of pixels within the block, and $d^C(m,n)$ denotes the contrast value of the current block. $d^C(m,n)$ can be used to calculate the contrast cue $\hat{d}^C(m,n)$ of the current block.

The depth cue fusion device 26 is adapted for fusing the motion cue and the contrast cue figured out by the motion cue calculator 22 and the contrast cue calculator 24, respectively, to get the initial depth map $D^{(O)}$. The aforesaid fusion is meant to have adjustable weights for the motion cue and the contrast cue according to the four types of camera motions classified previously by the camera motion analyzer 16.

In the aforesaid first type, the current frame is static and the contents of the current frame and the previous frame are nearly the same, so it is not necessary to re-estimate the depth information and the depth map of the current frame can be referred to that of the previous frame. After the fusion, the initial depth map $D^{(O)}$ is referred to the following equation (5).

$$D_i^{(O)} = D_{i-1}^{(O)} \quad (5)$$

In the aforesaid second type, the object in the frame is static and the camera is moving. If the amount of camera motion is subtracted from the image motion, there will be no motion, as well as motion cue, in the frame. Hence, the energy of the corrected motion vectors is only considered, disregarding the parameter computation and compensation of camera motions. The initial depth map $D^{(O)}$ after the fusion is referred to the following equation (6).

$$D_i^{(O)} = \hat{d}_i^M \quad (6)$$

In the aforesaid third type, the object in the frame is moving and the camera can be moving or not moving, with a low-complexity frame content. In this case, the motion cue is the strongest depth clue for depth perception of the human eyes, so the weight of the motion cue can be adjusted to be slightly larger than that of the contrast cue. The initial depth map $D^{(O)}$ after the fusion is referred to the following equation (7).

$$D_i^{(O)} = \omega_1 \times \hat{d}_i^M + \omega_2 \times \hat{d}_i^C \quad (7)$$

where $\omega_1$ is 0.6 and $\omega_2$ is 0.4.

In the aforesaid fourth type, the object in the frame is moving and the camera can be moving or not moving, with a high-complexity frame content.

Because the contrast values of the blocks in a high-complexity frame are often higher and the corresponding blocks are misrecognized as the foreground region, the weight of the contrast cue can be thus set lower. The initial depth map $D^{(O)}$ after the fusion is referred to the following equation (8).

$$D_i^{(O)} = \omega_1 \times \hat{d}_i^M + \omega_2 \times \hat{d}_i^C \quad (8)$$

where $\omega_1$ is 0.8 and $\omega_2$ is 0.2.

Figure 5:
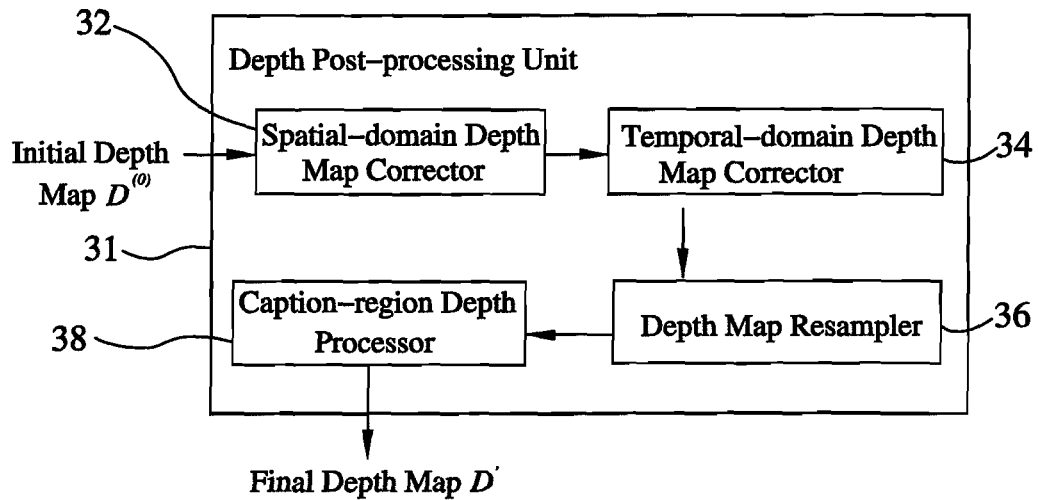
FIG. 5 is a block diagram of the preferred embodiment of the present invention, illustrating the framework of the depth post-processing unit.

The depth post-processing unit 31 is adapted for applying correction to the spatial domain and the temporal domain of the initial depth map $D^{(O)}$ to further increase the accuracy of the depth map, and for processing the caption in the video to generate a final depth map D'. In this embodiment, as shown in FIG. 5, the depth post-processing unit 31 includes a spatial-domain depth map corrector 32, a temporal-domain depth map corrector 34, a depth map resampler 36, and a caption-region depth processor 38.

The spatial-domain depth map corrector 32 can extract the foreground region from the current frame and then correct the depth of the foreground region.

Figure 6:
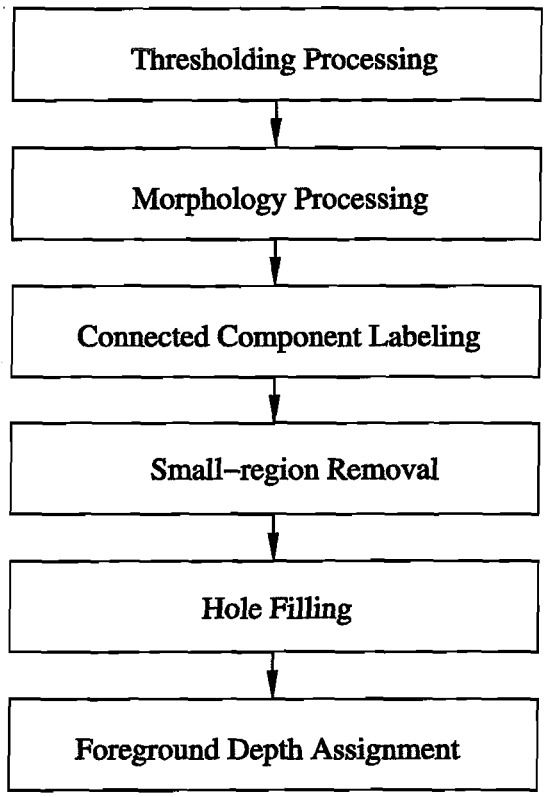
FIG. 6 is a flow chart of the preferred embodiment of the present invention, illustrating the process of the spatial-domain foreground depth refinement.

Referring to FIG. 6, the actual process includes the following steps: (1) Thresholding processing—determine a threshold by an iterative method; as the depth value in the initial depth map $D^{(O)}$ is bigger than the threshold, set the depth value for 255; as the depth value is smaller than the threshold, set the depth value for 0; (2) morphology processing—exploit morphology opening to eliminate the effect resulting from noises and make the contour of the object in the foreground region more complete; (3) connected component labeling—label each connected foreground region with a depth value 255 after thresholding to a unique integer and calculate the area of each connected region; (4) small-region removal—as the general video frame is concerned, the foreground objects usually occupy larger areas, so labeled regions of smaller sizes (than a threshold related to the frame size) will be deleted and re-labeled to be 0 for eliminating the small error regions resulting from noises or foreground false-positive classification; (5) hole filling—the object may contain smooth graylevel region which might be estimated with a smaller depth initial value and subject to misclassification as a background region after the thresholding process to result in holes inside the foreground objects, so when an image region labeled as background is surrounded by foreground regions, it will be filled (i.e., re-classified) with foreground labels; and (6) foreground depth assignment—assigns each foreground region, whose depth value is too small, with the mean depth value of its left and right adjacent regions. In this way, the spatial-domain depth correction applied to the foreground region is completed.

The temporal-domain depth map corrector 34 can correct the initial depth map $D^{(O)}$ processed by the spatial-domain depth map corrector 32 by means of filtering techniques to increase the depth continuity between adjacent frames. The filtering technique used here contains at least one of the exponentially smoothing filtering and the median filtering. Since each of the exponentially smoothing filtering and the median filtering techniques belongs to the prior art, so the detailed recitation is skipped.

Since the initial depth map is estimated based on a unit of 8×8 pixel block (i.e., a lower resolution than the color image), it is necessary to scale up the initial depth map by resampling techniques to increase the resolution. The depth map resampler 36 combines resampling and bilateral filter to simultaneously scale up and correct the low-resolution initial depth map $D^{(O)}$. Because depth estimation based on the image cues is still likely distorted, it is necessary to correct the depth map by bilateral filter so that the depth map can conform to the color image during the depth-map scaling-up process by the bilateral filter to enable the depth map to have the same resolution as that of the image and meanwhile to correct the depth map to enable the depth information to further match the original image.

Figure 7:
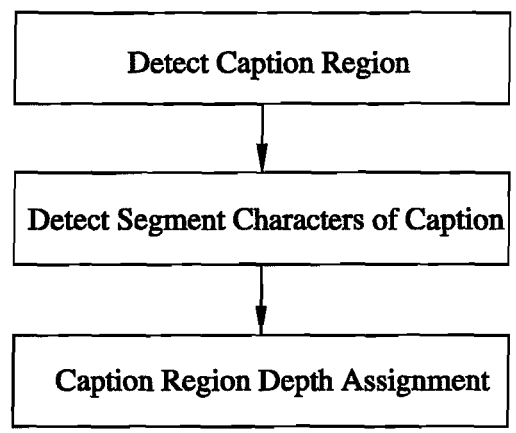
FIG. 7 is a block diagram of the preferred embodiment of the present invention, illustrating the process of the caption depth assignment.

The caption region depth processor 38, as shown in FIG. 7, can detect whether the caption region is available in the current frame beforehand. When the actual detection process proceeds, the detection region is set to be the lower ⅓ part of the frame and then the Sobel operator, which belongs to the prior art to need no more recitation, is employed for the calculation of edge magnitude at each pixel. When the edge magnitude is smaller than a preset threshold, it is ignored and filtered out. After the caption region is found, detect the characters within the caption region by means of pixel color information to segment the caption into separate characters, e.g. converting the pixel value (in YUV color space) within the caption region back to the RGB color space and then identifying whether it falls within the white color range according to the RGB value of each frame pixel therein (note that the color of the caption is subject to change with different videos) to extract the characters. Next, provide proper depth information for the caption. In actual operation, depth information can be assigned for the whole caption region or for the segmented characters only. After the depth correction, resampling, and filtering in the spatial domain and the temporal domain, and the depth processing of the caption region, a final depth map D' is generated.

Figure 8:
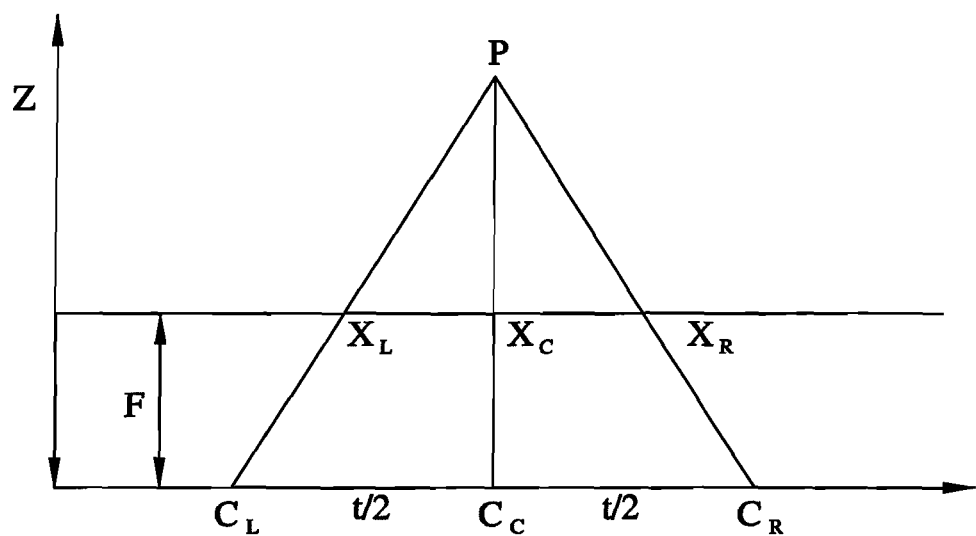
FIG. 8 is a chart of the preferred embodiment of the present invention, illustrating how the depth map is used to synthesize a 3D video frame.

The stereoscopic video generation unit 41 is adapted for synthesizing the final depth map D' and the 2D video datum to generate 3D video datum. In this embodiment, the stereoscopic video generation unit 41 can exploit depth-image-based rendering technique, as shown in FIG. 8, with features of positive parallax and negative parallax, to synthesize stereoscopic images with the final depth map D' and the 2D video datum. In FIG. 8, $C_C$ denotes the original central image, $C_L$ denotes the left-eye image to be synthesized, $C_R$ denotes the right-eye image to be synthesized, t denotes the baseline length, F denotes the focus length and is usually a constant, P denotes one point in 3D space, and Z denotes the depth of P with respect to the camera center; P is imaged at $(X_C,Y)$ for the original image, synthesized at $(X_L,Y)$ for the left-eye image, and synthesized at $(X_R,Y)$ for the right-eye image.

It is to be noted that the present invention is applicable to real-time 2D to 3D stereo conversion by parallel programming acceleration. For example, the common parallel processing library, OpenMP, can be used for multi-thread parallel programming. In this way, the conversion speed performance can meet the public requirement.

In conclusion, the present invention can reach the following effects.
1. It can enhance the depth quality of the converted video, improve the depth continuity between adjacent time instances, and thus increase the comfort of users' eyes while they are watching the video.
2. It can process the caption region for better stereoscopic perception and more watching comfort.
3. It is applicable to real-time conversion of 2D video to 3D video to meet the public requirement.

Although the present invention has been described with respect to a specific preferred embodiment thereof, it is in no way limited to the specifics of the illustrated structures but changes and modifications may be made within the scope of the appended claims.

What is claimed is:

1. A system for converting 2D video to 3D video, comprising:
a video content analysis unit for analyzing a 2D video datum and extracting useful information including motion and color for depth estimation;
a depth estimation unit for receiving the useful information, calculating motion cue and contrast cue for initial depth estimation, and generating an initial depth map;
a depth post-processing unit for correcting the initial depth map in spatial domain and temporal domain to increase accuracy of the depth map in spatial domain and increase depth continuity between adjacent time instances and processing caption information in the video to generate a final depth map; and
a stereoscopic video generation unit for synthesizing a 3D video datum based on the final depth map and the 2D video datum,
wherein the depth estimation unit comprises a motion cue calculator, a contrast cue calculator, and a depth cue fusion device, the motion cue calculator is to divide the frame into a plurality of blocks for calculating the motion vector associated with each of the blocks or acquiring the motion vector decoded by a video decoder to further figure out the motion cue and then to identify whether they require correction or not based on the distribution of the motion vectors, in all directions, of the current block and its 3×3 adjacent blocks; if the number of the blocks belonging to the dominant direction is smaller than a predetermined value, it will be identified that motion vectors around the current block are somewhat random and they do not need any correction; if the number of the same is larger than said predetermined value, then correct the motion vector of the current block to be the mean vector of motion vectors belonging to the dominant direction and recalculate the motion cue; the depth cue fusion device can fuse the motion cue and the contrast cue figured out by the motion cue calculator and the contrast cue calculator to get the initial depth map, the aforesaid fusion being meant to have adjustable weights for the motion cue and the contrast cue according to four types of camera motions classified previously by a camera motion analyzer.

2. The system as defined in claim 1, wherein the video content analysis unit comprises the video decoder, a scene change detector, and the camera motion analyzer; when the 2D video datum is a compressed video datum, the video decoder decodes the 2D compressed video datum to acquire YUV information for depth estimation and acquire motion vectors as object motion information for depth estimation, the YUV information and the motion vectors being the useful information; based on an improved histogram comparison method, the scene change detector can compare the luminance distributions between adjacent frames in the 2D video datum to further identify whether there is any scene change; the camera motion analyzer can analyze and classify the style of camera motion, the amount of movement of an object in the frame, and the complexity of frames in the 2D video datum.

3. The system as defined in claim 2, wherein the improved histogram comparison method is to divide the current frame into a plurality of image blocks and compare the histograms of the blocks at the same positions between adjacent frames, a histogram difference threshold is set for each block, which is different from each other, the histogram difference thresholds of the blocks near the center are bigger, whereby the number of blocks whose differences exceed the threshold can be counted to identify whether there is any scene change.

4. The system as defined in claim 2, wherein the classification done by the camera motion analyzer comprises four types: (1) both of the object and the camera are static, i.e. the frame content is static; (2) the object is static and the camera is moving; (3) the object is moving and the camera can be moving or not moving, with a frame content of low complexity; and (4) the object is moving and the camera can be moving or not moving, with a frame content of high complexity.

5. The system as defined in claim 4, wherein whether the frame content is of low or high complexity is determined based on the graylevel variance of the frame pixels; if the graylevel variance of the frame pixels is larger than a threshold, it will be classified as high complxity; on the contrary, it will be classified as low complexity.

6. The system as defined in claim 1, wherein the depth post-processing unit comprises a spatial-domain depth map corrector, a temporal-domain depth map corrector, a depth map resampler, and a caption region depth processor, the spatial-domain depth map corrector being adapted for extracting a foreground region from the current frame and then correcting the depth of the foreground region, the temporal-domain depth map corrector being adapted for correcting the initial depth map by means of filtering techniques to increase the depth continuity between adjacent time instances, the depth map resampler being adapted for scaling up and correcting the initial depth map by means of resampling techniques and bilateral filter, the caption region depth processor being adapted for detecting whether the caption region is available in the current frame beforehand, next segmenting characters within the caption region, and further providing the caption with proper depth information; after the aforesaid depth correction, resampling, and filtering in the spatial and the temporal domains, and the depth processing of the caption region, the final depth map is generated.

7. The system as defined in claim 6, wherein the filtering technique can be at least one of the exponentially smoothing filtering and the median filtering techniques.

8. The system as defined in claim 1, wherein the stereoscopic video generation unit can exploit depth-image-based rendering technique, with features of positive parallax and negative parallax, for synthesizing the 3D video datum from the final depth map and the 2D video datum.

* * * * *